(12) United States Patent  (10) Patent No.: US 8,345,993 B1
Weeks  (45) Date of Patent: Jan. 1, 2013

(54) ELECTRONIC CODING SYSTEM FOR SECURITY OF IDENTIFICATION

(76) Inventor: Glenn E Weeks, Surprise, AZ (US)

( * ) Notice: Subject to any disclaimer, the term of this patent is extended or adjusted under 35 U.S.C. 154(b) by 1045 days.

(21) Appl. No.: 12/256,389

(22) Filed: Oct. 22, 2008

Related U.S. Application Data

(60) Provisional application No. 61/000,085, filed on Oct. 24, 2007.

(51) Int. Cl.
*G06K 9/36* (2006.01)
*G06K 9/46* (2006.01)

(52) U.S. Cl. ........ 382/232; 382/173; 382/174; 382/176; 382/177; 382/178; 382/100; 380/37; 380/42; 713/176; 705/44; 345/626; 345/629

(58) Field of Classification Search ....................... 380/28
See application file for complete search history.

(56) References Cited

U.S. PATENT DOCUMENTS

| 4,586,711 | A | | 5/1986 | Winters et al. | |
| 5,396,559 | A | * | 3/1995 | McGrew | 380/54 |
| 6,718,047 | B2 | * | 4/2004 | Rhoads | 382/100 |
| 2008/0252066 | A1 | * | 10/2008 | Rapoport et al. | 283/94 |

* cited by examiner

*Primary Examiner* — Nathan Flynn
*Assistant Examiner* — Bryan Wright
(74) *Attorney, Agent, or Firm* — Schmeiser, Olsen & Watts LLP

(57) ABSTRACT

A multi-level data encoding system is provided that is operable on a computer. The encoding system includes a data input device adapted to input a data set and store the data set in a database. The system further includes an encoder adapted to encode the data set and separate the encoded data set into two files, wherein each character of the data set comprises a unique electronic footprint. Additionally, the system includes a data field adapted to organize the encoded data set for proper decoding, a master file comprising one file of the encoded data set and an overlay file comprising the other file of the encoded data set. The system also includes a decoder adapted to align the overlay file onto the master file to decode the encoded data set.

19 Claims, 6 Drawing Sheets

ELECTRONIC CODING SYSTEM FOR SECURITY OF IDENTIFICATION

CROSS REFERENCE TO RELATED APPLICATION

This application claims priority to U.S. Provisional Patent Application entitled "MULTIKEY," Ser. No. 61/000,085, filed Oct. 24, 2007, the disclosure of which is hereby incorporated entirely herein by reference.

BACKGROUND OF THE INVENTION

1. Technical Field

This invention relates generally to an electronic coding system and more particularly to a multi-level data encoding system for securing identification data.

2. State of the Art

The approach to electronic security to date has been built on developing a more sophisticated encryption system. The conventional standard for credit card encryption coding has been the RSA model. RSA's approach is to use two numerical keys. One is a public key, which is known by sender and credit provider. Only the sender knows the other key, the private key. The two keys are required to be activated simultaneously to enable secure transactions to occur. While encryption certainly is important and useful, the fundamental vulnerability of the system remains; namely, all critical data (the customer account number) is located in one place, in the encrypted double-keyed data signature. Negotiation of the double-keyed signature allows access to the critical data.

The RSA model has limitations noted as early as 1995. An article, "Picking the Crypto Locks," appeared in the October 1995 issue of BYTE magazine pointing out that the security of the RSA encryption system is vulnerable to advances in factoring. In 1994 a 129-digit number was successfully factored utilizing the idle time of 1600 Internet connected computers with a computation algorithm called the quadratic sieve. A newer and faster general number field sieve promises to factor a 512-bit number over ten times faster. And massively parallel computer advances are increasing computational power by a factor of ten every five years, making a 1280 bit encryption key vulnerable to factoring.

Code-breakers tested 88 billion possible combinations every second for fifty six (56) hours until they unlocked a message scrambled using a government-approved method called the Data Encryption Standard ("DES"). This was done with the brute force of a single, custom-built computer. It is believed that a 6 by 6 inch optical computer, if built, would be able to crack the larger encrypted keys above 512 and to do it in record time. Even elliptical based algorithms become vulnerable to factoring.

Encryption has been successful to date because encryption keys have been regularly increased in size. This will work as long as computer speeds do not reach the speed levels required to factor the increased encryption key sizes. However, when general computing speeds increase to the point where key factoring is no longer a prohibitive task encryption utilized to secure electronic transaction data will no longer be a secure process.

Accordingly, there is a need in the field of electronic coding systems for an improved electronic coding system that does not have the limitations of conventional key encryption technology.

DISCLOSURE OF THE INVENTION

The present invention relates to an electronic coding system made up of a multi-level data encoding system that separates captured or inputted data sets into two separate files, each file required to be verified in order to decode the data set.

Aspects of the present invention include a multi-level data encoding system operable on a computer, the encoding system comprising a data input device adapted to input a data set and store the data set in a database and an encoder adapted to encode the data set and separate the encoded data set into two files. Each character of the data set comprises a unique electronic footprint. The system may also include a data field adapted to organize the encoded data set for proper decoding, a master file comprising one file of the encoded data set and an overlay file comprising the other file of the encoded data set. Further, the system may include a decoder adapted to align the overlay file onto the master file to decode the encoded data set.

Another aspect of the present invention includes a multi-level data encoding system operable on a computer, the encoding system comprising an encoder adapted to encode a data set and separate the encoded data set into two files, a master file comprising one of the files of the encoded data set and an overlay file comprising the other file of the encoded data set. The overlay file may be adapted to display at least one unique character when appropriately aligned in combination with the master file, wherein the master file is encoded to manifest and recognize a plurality of characters the data set contained within an overlay file. The master file may comprise a visual coded pattern having a random number allocated dot pattern controlled by at least one algorithm selected by at least one random number generator, creating a unique electronic footprint. The system may also include a code matcher function adapted to compare the incoming data set on the overlay file and the master file with a master file stored in a database on a readable memory of a computer to verify at least one code match.

Another aspect of the present invention may include a coding process for a multi-level data encoding system comprising the steps of inputting at least one data set into at least one data set file; applying at least one coding algorithm to the at least one data set; encoding the at least one data set; separating the at least one data set into at least two files, wherein the at least two files comprise at least one master file and at least one overlay file; using the at least one master file and the at least one overlay file to decode the encoded data set; and testing the overlay file when received with information contained in the master file to verify at least one code match.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
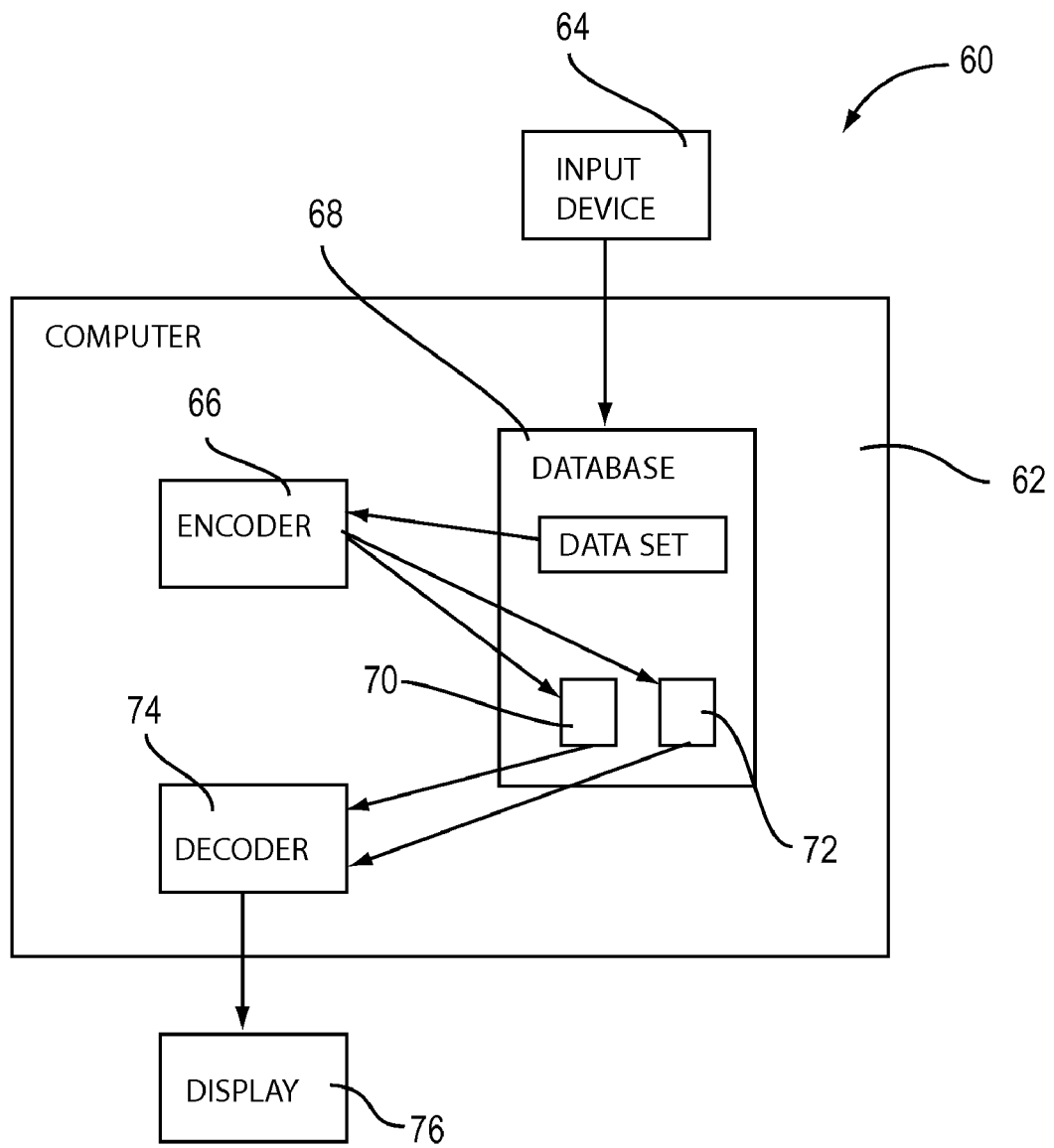
FIG. 1 is a schematic view of a multi-level data encoding system in accordance with the present invention.

As discussed above, embodiments of the present invention relate to an electronic coding system made up of a multi-level data encoding system that separates captured or inputted data sets into two separate files, each file required to be verified in order to decode the data set.

A multi-level data encoding system represents a significant advance in coding technology, providing improved security for on-line transaction functions and wireless applications. For electronic security applications, the present invention provides an improved, fraud-proof level of security that is not currently possible with encryption methods now employed in on-line identification.

The significance of embodiments of the system of the present invention is that a single dot coding pattern can accommodate many different coded overlays and produce many different images in one message file of the system. This capability allows multi-character/digit identification numbers or symbols encoded in the same message space to be used in security identification.

With respect to particular embodiments of the present invention, the coding format is such that a singular multi-coding capability provides unique identification characteristics that include: 1) Each encoded identification constitutes a singular unique electronic footprint. Coding patterns are unlimited. Each system encoding session produces unique coding patterns. The system can create many millions of unique identification patterns—every person in the world could potentially have their own coded identification, each coded format being unique to that individual; 2) The ability to protect the integrity of identification account numbers. (Should an account number be lost or stolen the original number can be reconfigured via a new coding pattern and the old coding pattern can be disabled and rendered unusable. The integrity of the original account number is maintained.); and 3) In a useful password system, the probability of compromise of a password increases during its lifetime, and unauthorized reading and writing of the password database is a concern, however, with this system this is not an issue.

According to particular embodiments of the present invention, applicable system security applications include, but are not limited to:

Commercial Applications including, Banking Account ID Security. Secure money transfers; Cell Phone & HAND Held Device Transmission ID Security; Computer to Computer IS Security/Password Security; Music/Film Download ID Control; Product Part Labeling Security; Package Product Security Labeling; Retail Personalized Credit Card/Personalized Catalog Access With Approved Credit Line; and Scanner Identification Systems; and Government/Military Applications including, Personal ID Card/Immigration Identification; Government (Digital) Password management: Group ID, multi-level classification i.e., Classified, Secret, Top Secret or special clearance, Communications Security Controls, Personnel Security Controls, Emanations Security; Communication Link: (between field and/or command control.); Official Use Only—classified as official use security identification; DoD Contractor Proprietary Information; Privacy Act Information; Sensitive Mission Data: (Such as mission capability/performance.); System Capabilities, Vulnerabilities, Concept of Operations/Architecture; Controlled and Secure Itinerary Access; Threat Suppression Message Identification; Preparing and Securing Downgraded Extracts—copy information from a volume of media at one sensitivity level to another volume that is at a lower sensitivity level; Front end identification to format and secure a new volume of media; make sure that it has never been written on before; Sensitivity Marking of Removable Storage Media; and Specific coded characters can be a set aside for law enforcement access.

Since no single encoded data set location or file contains all the information necessary to form a complete message or symbol, the problem of fraud and unwanted identification is eliminated. For example, and without limitation, fifty percent or less of message information is not enough for decoding; even when the most sophisticated decoding techniques are employed. The implications of this security feature led to the development of the present system as a security product.

Particular embodiments of the present invention include an encoding system with message control technology that employs an advanced mathematical model analogous to that of the Rubik cube and requires the utilization of specialized database tracking techniques, as the computer tracks and controls all system space to the pixel level. In addition, system random number driven coding algorithms simultaneously create coding patterns that are never repeated. Each system encoded symbol is a unique occurrence, a singular electronic footprint.

Initial security development of the encoding system was intended for electronic transmission of data such as occurs on the Internet. Financial institutions with requirement for secure international E-money transactions were an obvious market. However, other security applications of the present invention include, without limitation, secure computer-to-computer identification, encoded E-mail transmissions, secure computer passwords, secure tamperproof personnel identification cards, secure identification of music record labels (SDMI wrapper technology complement), product licensing systems and product identification systems utilizing optical scanner reading of System encoded data formats. And one of the most recent applications to become evident as a market for System security technology is that of the wireless world, hand-held devices and cell phones. When flaws were discovered in the on-line (WI/FI) transmission security of encrypted files, the 802.11b Wired Equivalent Privacy (WEP) algorithm, it was evident that the present invention could become a major player in this market by providing a solution to this transmission security problem as System encoding is not subject to on-line statistical monitoring and effective modification of encoded data streams.

The encoding system of the present invention has coding technology that adds significant value to security applications. The implications of the new encoding system paradigm reach every area of electronic security identification.

With reference to the drawings, embodiments of the multi-level data encoding system provide a security technology that represents a paradigm change in the approach to data security. The system's security capability significantly exceeds that of the keyed encryption systems.

System technology, with its secure identification code matching, data separation, and multilevel encoding capabilities, provides the ideal answer to the problem of secure online transaction identification processing even in the presence of increased computer speeds. This is so because the system's unique approach is to encode actual data and to then separate the data elements into two components, a radical concept difference in handling the problem of data security.

FIG. 1 shows a multi-level data encoding system 60 in accordance with particular embodiments of the present invention. The encoding system 60 may include a data input device 64 adapted to input a data set and store the data set in a database 68 of the computer 62. The system may further include an encoder 66 adapted to encode the data set and separate the encoded data set into two files. Each character of the data set comprises a unique electronic footprint. The system may also include a data field (shown in FIG. 2A) adapted to organize the encoded data set for proper decoding.

The two files may include a master file 70 comprising one file of the encoded data set and an overlay file 72 comprising the other file of the encoded data set. Further, the system may include a decoder 74 adapted to align the overlay file onto the master file to decode the encoded data set. The decoded data set may then be rendered on display 76 according to particular embodiments of the present invention.

The overlay file 72 may be adapted to display at least one unique character when appropriately aligned in combination with the master file 70, wherein the master file 70 is encoded to manifest and recognize a plurality of characters the data set contained within an overlay file 72. The master file 70 may comprise a visual coded pattern having a random number allocated dot pattern controlled by at least one algorithm selected by at least one random number generator, creating a unique electronic footprint. The system may also include a code matcher function utilized by the decoder, wherein the code matcher function is adapted to compare the incoming data set on the overlay file 72 and the master file 70 with a master file 70 stored in a database 68 on a readable memory of a computer 62 to verify at least one code match. While it is shown that one computer houses all of the components of the encoding system 60, it will be understood that multiple computers may be connected through the internet, wirelessly or by other communications means wherein the overlay file 72 may be transferred from one computer to another. The decoder may then be utilized to decode the overlay file, so long as the computer performing the decoding has the master file 70 or may obtain access to the master file 70 associated with the overlay file 72.

Figure 2A:
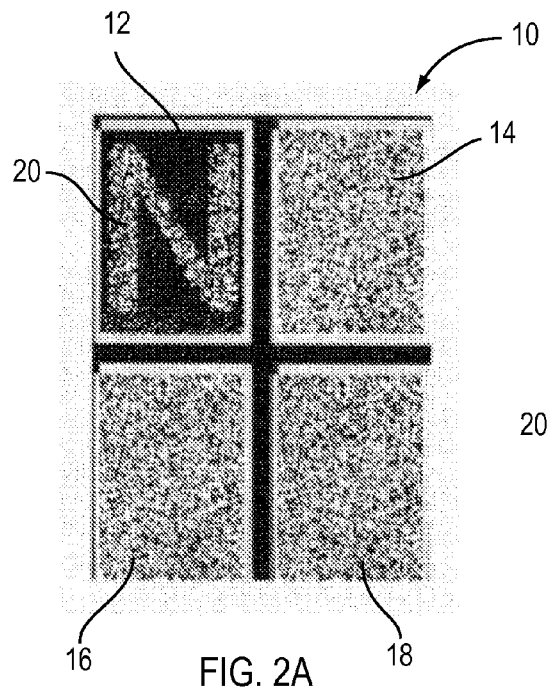
FIGS. 2A-2C are front views of an encoding format of a multi-level data encoding system.
Figure 2B:
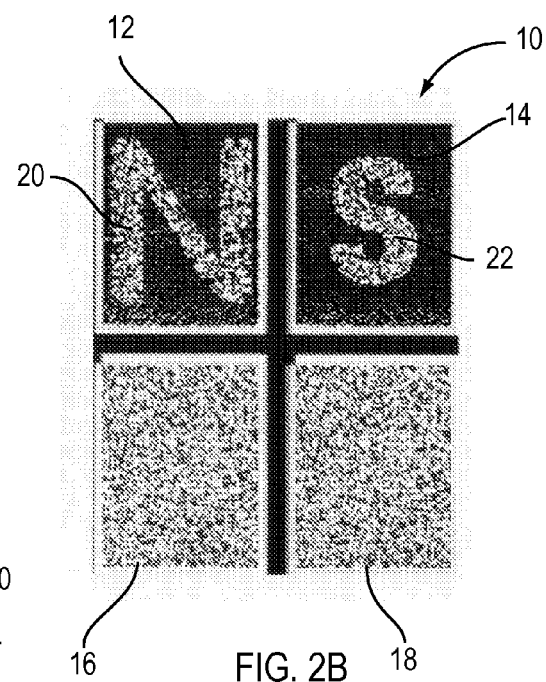
Figure 2C:
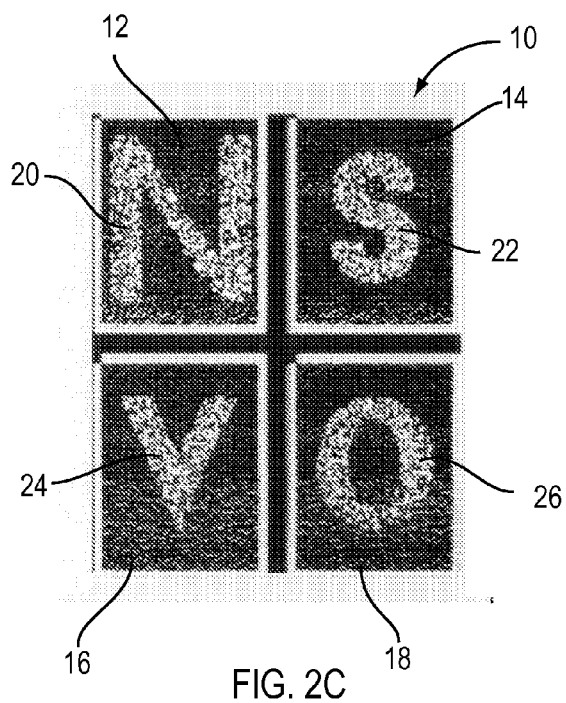

FIGS. 2A-2C depicts the encoding format of the encoding system in accordance with particular embodiments of the present invention. FIG. 2A shows a data field 10 having quadrants 12, 14, 16 and 18. Quadrant 12 has a unique coding pattern that renders the character N, As shown in FIG. 2B, quadrant 14 has a unique coding pattern that renders the character S. And as shown in FIG. 2C quadrant 16 has a unique coding pattern that renders the character V and quadrant 18 has a unique coding pattern that renders the character O.

The encoding system security implementation may use the data field 10 formatted in quadrants 12, 14, 16 and 18. The use of quadrants results in a plurality of possible data field configurations. In this expanded application of the encoding system a user may need to encode a 15-20 digit credit card account number, the alpha-numeric character string 3731 02001 03042 1413W. The first digit of the number, "3," might be assigned to data quadrant 18, while the second digit, 7, might be assigned to data quadrant 12, and so forth. This process continues until all 15-20-account characters are assigned data field locations or quadrants. Typically, five multilevel encoded characters are assigned to any one data field/quadrant location, however, the practical limit is ten multilevel encoded characters in one data field.

It will be understood that while the quadrants 12, 14, 16 and 18 are each equal in size, the present invention is not limited to this particular quadrant configuration. Any shaped and sized quadrants may be used. For example, and without limitation, the quadrants may be different sized rectangle, may divided in vertical rectangles, triangles, polygonal shapes, rectilinear shapes and the like.

A unique characteristic of the encoding is that in any of these four coding quadrants a special character (s) can be set aside for access by law enforcement—a character is coded by not used or distributed for general use. This (these) special character (s) can be reserved only for law enforcement access and would allow priority access to any record.

Figure 5:
FIG. 5 is a front view of an electronic footprint in accordance with the present invention.

Each encoding occasion creates a unique coding pattern in each of four coding quadrants. As coding (the creation of a random number allocated dot pattern formats in various configuration combinations) is controlled by different algorithms selected, in turn, by a random number generator, each coded format is a unique electronic footprint. As shown in FIG. 5, an electronic footprint 80 is shown. The footprint 80 may include encoding for up to twenty characters. The location assignment is also the function of a random number generator, which assigns the character locations at encoding generation time The assignment locations are recorded in the master file and are used to read incoming overlay file data for matching purposes. When the incoming encoded overlay file is read, the master file read program compares the incoming overlay file data with the encoded master file. A complete match of all twenty characters in the correct quadrant locations generates a completed transaction and the encoding system releases the account for further handling.

Figure 3:
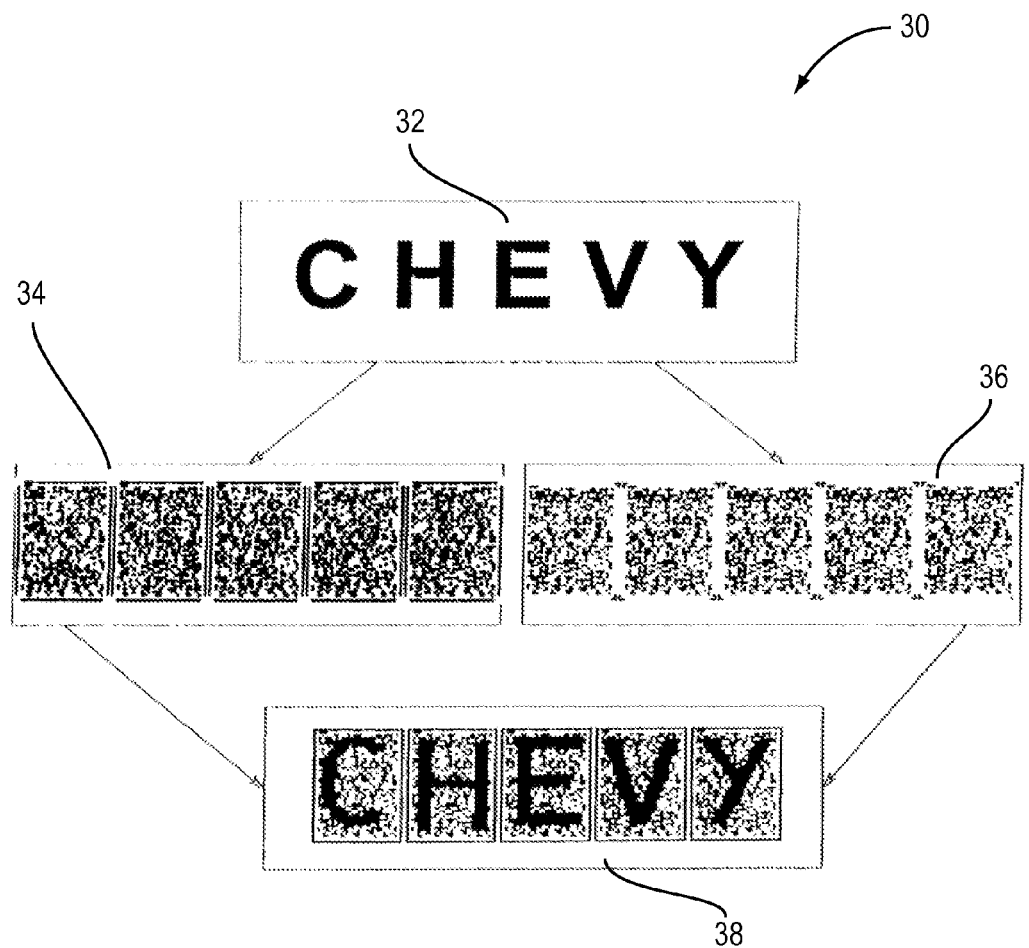
FIG. 3 is a flow chart of separation of data sets using a multi-level data encoding system.
Figures 4A, 4B, 4C, 4D, 4E:
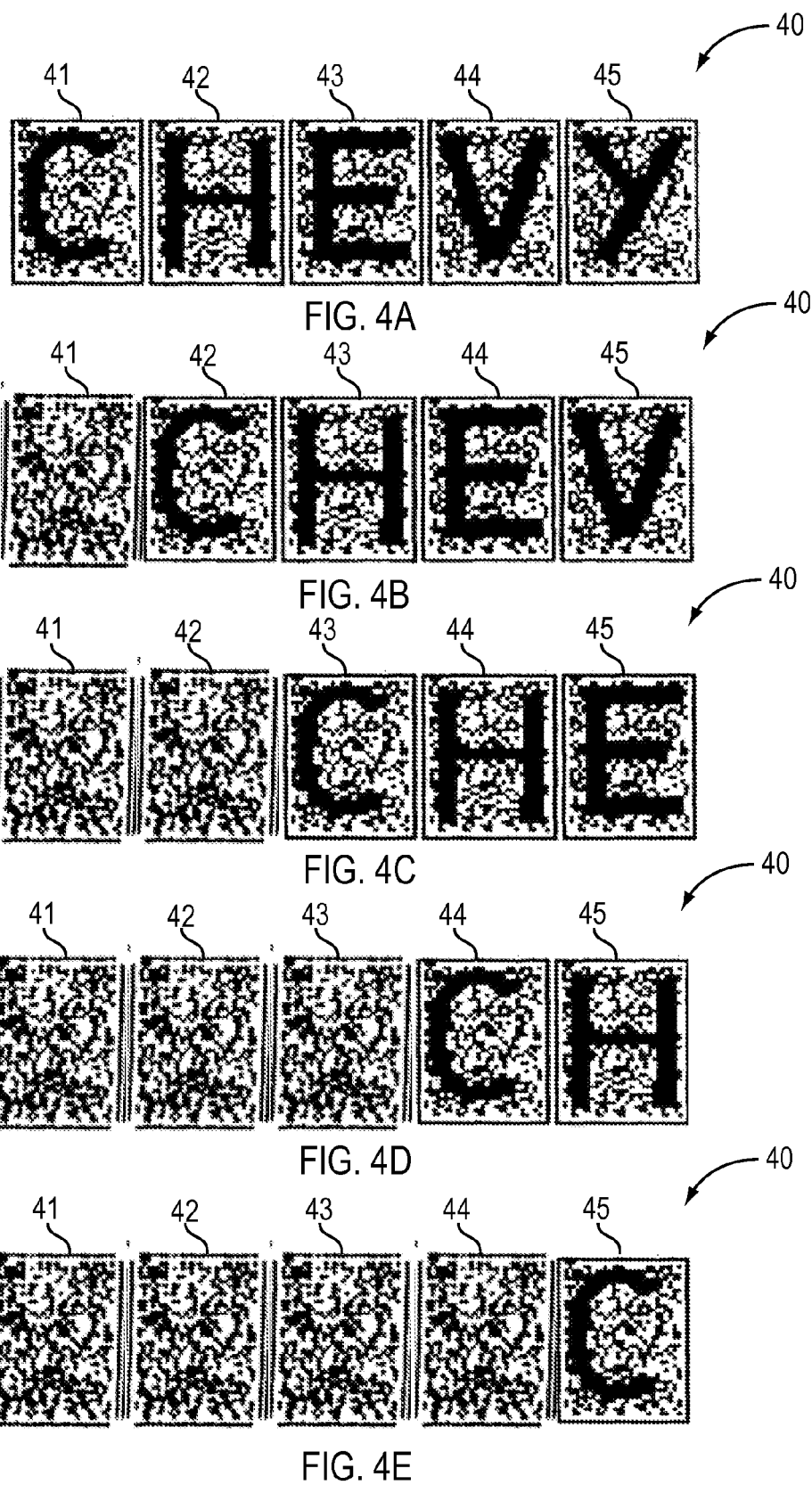
FIGS. 4A-4E are front views of a data set utilizing multi-level data encoding accordance with the present invention.

Referring to the drawings, FIG. 3 depicts a flow chart of how the encoding system of the present invention separates data. The system coding process 30 begins when a data set 32, which can be a symbol or picture, is inputted into a file. The system program reads this data and applies the unique coding algorithms, which performs encoding, and file separation into a master file 34 and an overlay file 36. According to particular embodiments, because only fifty percent or less of the original information is contained in either separated file the encoding is secure, even when the most sophisticated decoding processes are employed on a separated file. Fifty percent or less of the original data is not enough information to permit decoding or information extrapolation to the original data. The overlay of the overlay file onto the master file results in decoding the data set 32 that was encoded. Decoding cannot occur without the presence of the complementary overlay file 36. The resolution of the decoded data set 32 may be controlled by the coding used. The more grains in a dot pattern used, the more detail and higher the resolution is. Accordingly, the system may alter the resolution in order to achieve a desired decoding time with a desired resolution for the purposes required by the user of the system.

Referring to FIGS. 4A-4E, embodiments of the present invention include multiple-level coding capability. In this example the word CHEVY has been computer scanned and coded with the unique system coding patterns shown as encoded dataset 40. Each of the five character data fields 41, 42, 43, 44 and 45 of the CHEVY example contains coding for each of the five letters.

The master file and the overlay file are placed in visual registration producing the word 'CHEVY'. If the overlay file is moved one data field to the right the first four characters of the word CHEVY will appear to have moved to the right resulting in the characters "CHEV" as shown in FIG. 3B. Further movement of the overlay file by one data field will cause the first three characters of CHEVY to appear to move to the right, resulting in the characters "CHE" as shown in FIG. 3C. Movement of the overlay file by another data field will cause the first two characters of CHEVY to appear to move to the right, resulting in the characters "CH" as shown in FIG. 3D. Finally movement of the overlay file by one data field will cause the first character of CHEVY to appear to move to the right, resulting in the character "C" as shown in FIG. 3E. This decoding is possible because each data field in the word CHEVY is multi-level encoded with the five characters of the word CHEVY. This example of encoding represents six levels of coding. Electronic reading of encoded files enables coding densities of up to ten levels of multi-level encoding. Electronic matching of coded files is more precise than is visual matching of complementary files, which is subject to variations in output formats.

Since ten levels of coding may be achieved in any one data field, the integers 0-9, alpha characters A-Z or other graphic symbols may be encoded.

The overlain frames illustrate the system's multilevel coding capability, as the master file is coded to recognize all four characters in the data set. The system's read function or decoder tests for the presence of all four coded characters in an assigned data field of the system.

The system process stands in contradistinction to number factoring systems such as are used in encryption algorithms—factoring a finite number in encryption is essentially a function of computer speeds in testing all possible number combinations of a number of a certain size until its factors are determined. In comparison you could run pixel expansions in various combinations endlessly but since possible pixel relationships are essentially unbounded the chances of creating an encoded character, or identifying a particular series of account numbers accurately at some point, is very remote, if not impossible.

Direct manual duplication of system encoded formats must negotiate all the dot pattern nuisances of the system encoding process to the pixel level, allocating them correctly, to identify a complementary match for a particular character or set of multilevel encoded characters. If you do not know what characters you are looking for or where they are located in system data space the identification problem is untenable.

There is a further caveat. Someone attempting to duplicate system character input formats of the alphanumeric characters comprising a particular data set must first know what characters they are looking for, and the character sizing and style characteristics of the input characters that drive encoding algorithms. The system utilizes scanned alphanumeric character input to create characters while picture data or graphic data inputs directly into coding formats. The scanned alphanumeric characters interface to a stored character library set, which, in turn, drive the coding algorithms. It is important that the character size and style formats to be encoded are derived from this character library for attempts at character duplication to trigger algorithm action require the presence of specific system formats.

Encoded dot patterns reflect the coordinates of multilevel encoding, all critical coding necessary to identify a number of characters all occupying the same System data space. System utilizes advanced database techniques to track all system multilevel encoding data space, a process analogous to that of the mathematics of the Rubik Cube. Realizing pixel permutations of all possible pixel combinations in a data field in an effort to duplicate a particular multilevel encoded data set is an untenable process. Without prior character knowledge, sizing and character style knowledge that relates to the system's multilevel encoded data space, this task is virtually impossible, even with significantly increased computer speeds.

Embodiments of the encoding system cannot be factored in a usage environment. The following are summary reasons why we believe factoring of encoded data cannot occur.

Factoring system data space is (1) a function of predicting all the graphic elements in the design of a character (cited above), (2) locating the correct characters to be decoded in system field data space, and (3) anticipating the diverse coding patterns resulting from randomly allocated system encoding algorithms which operate to encode multilevel characters in system data space. All of these system coding elements are variables. Fifty percent of the encoded data provided to user/customers in the complementary ½ of the encoded data set does not provide enough information to enable extrapolation to these variable elements and for decoding to occur.

This becomes readily apparent when the format specifics of system encoding data space are reviewed. A system format review will reveal that the random dot encoding patterns are generally spread uniformly in encoding space. Coding conventions and densities are uniform and appear repetitiously similar in all encoding instances. A code breaker thus has the problem of attempting to extrapolate to intelligible data from an undifferentiated coding format. It is the simple question of where and what data boundaries exist to begin the quest for the definition of intelligible data.

All coding patterns are keyed to a random non-human sensible format. Indeed there are no predetermined graphical system formats that tie to any data index. Thus a random pixel expansion of the coded format in any order and undergoing infinite iterations in an attempt to duplicate the encoded complement overlay is a futile exercise revealing nothing. Only the system encoded complement overlay generated in conjunction with the original data encoding session will reveal the multi-level encoded data that exists.

In addition, it is not practical or allowed for a counterfeiter, under actual usage conditions, to test many millions of coding combinations against the master file in an attempt to match the master file. It must be remembered that one system format is not a generalized data index that once factored opens a key to other system encoded formats. Each system encoded data set remains a unique occurrence. Only a complement of a full encoding session is available to the user. The other half of the complement data remains with the data provider. Access to that half of the data is generally restricted. Further, the system process does not inform the counterfeiter when a miss-read occurs. Only the successful system coding match is recognized. All these factors militate against fraud and defy decoding.

Yet someone may argue that a data-decoding pattern could be determined from monitoring transmitted data. The answer is that because system algorithms are randomly selected the resultant system encoded dot pattern formats are unpredictable and random. This is true even when the same data elements (characters) are recoded. Each system encoded format is a unique electronic occurrence—a singular electronic footprint. For this reason electronic monitoring of encoded on-line data traffic will not yield a uniform coding pattern or useable data identification format. On-line introduction of extraneous data into a system transmission would only cause rejection of the transmission at the database matching read level. Thus the introduction of extraneous on-line data is self-defeating. The system is secure.

The enclosed data represents approximately 3-5 k of data for full electronic transmission purposes. However, critical system reading identification techniques can reduce the transmitted data requirement to as few as eight to twelve data points, the size of a user password. This is possible because system data is comprised of the presence or absence of coding configuration markings—the distinctive dot patterns. As each instance creates unique data configuration coordinate patterns distinctive to that encoding session electronically reading select open areas (or vice versa) of a particular encoding signature determination can be made as to the applicable coding. Transmission of these co-ordinate data points allows a recursive check routine to run which verifies the accuracy of the read data.

Data origination points (transaction terminals) are identified via an ID code/pattern. identification characteristic. Should external 'sniffer' programs be employed to read transmissions from these terminals the unique terminal ID patterns cause read shifts at the overlay decoding point and the data is rendered unreadable A review of the following expanded System data format indicates the following: System encoding patters are spread uniformly in System encoding space; Coding conventions and densities generally are uniform and appear repetitiously similar in all System instances; A code breaker has the problem of attempting to extrapolate to intelligible data from an undifferentiated coding format. It is the question of where data boundaries begin in the quest for the definition of intelligible data; and All coding patterns are keyed to a random non-human sensible format. In System are no predetermined graphical System formats that tie to any data index. Thus a random pixel expansion of the coded format in any order and undergoing infinite iterations in an attempt to duplicate the encoded complement overlay is a futile exercise revealing nothing.

In use, a customer/user account/ID is encoded at subscription time. A matched set of complementary coded ID components is created.

One-half of the coded ID component is provided the customer/user via Mini-CD or alternately via a Plastic Card with a magnetic coded strip and/or printed graphic representation. (Mini-CD's allows sixty pages of catalog information to be included.) The other half of the ID component is retained in the vendor DB for identification purposes.

With on-line systems the users log on and the System ID is read—transaction authorized when ID is matched. No other ID will be recognized.

Alternative input recognition of system encoding is via scanner reading systems.

Figure 6:
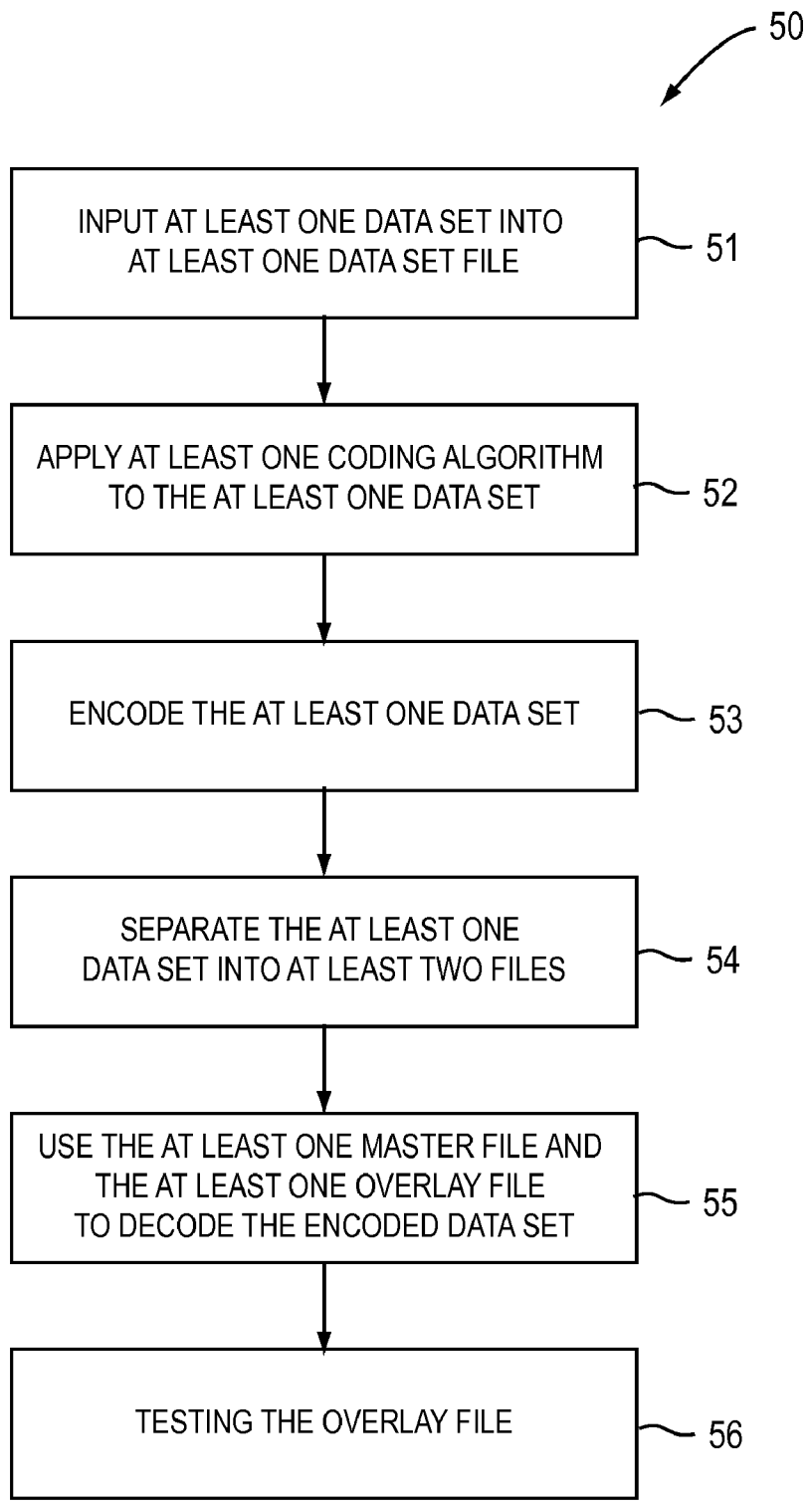
FIG. 6 is a flow chart of a process for using a multi-level data encoding system.

Referring further to the drawings, FIG. 6 depicts a flow chart of a method 50 of using a multi-level data encoding system. The method may include the steps of inputting at least one data set into at least one data set file (Step 51); applying at least one coding algorithm to the at least one data set (Step 52); encoding the at least one data set (Step 53); separating the at least one data set into at least two files, wherein the at least two files comprise at least one master file and at least one overlay file (Step 54); using the at least one master file and the at least one overlay file to decode the encoded data set (Step 55); and testing the overlay file when received with information contained in the master file to verify at least one code match (Step 56). The at least one master file comprises no more than fifty percent of the encoded data set. Further, the at least one overlay file comprises no more than fifty percent of the data set.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A multi-level data encoding system operable on a computer, the encoding system comprising: a data input device adapted to input a data set and store the data set in a database; an encoder adapted to encode the data set and separate the encoded data set into two files, wherein each character of the data set comprises a unique electronic footprint; a data field adapted to organize the encoded data set for proper decoding; a master file comprising one file of the encoded data set; an overlay file comprising the other file of the encoded data set; a decoder adapted to align the overlay file onto the master file to decode the encoded data set, wherein one of the at least one data files comprises a master file coded to combine with a plurality of overlay files to produce a variety of manifestations depending on which of the overlay files is placed over the master file; and wherein the data field comprises quadrants, each quadrant having a unique coding pattern.

2. The encoding system of claim 1, wherein each of the master file and the overlay file comprises at least one visual coded pattern.

3. The encoding system of claim 2, wherein the at least one visual coded pattern comprises a random number allocated dot pattern controlled by at least one algorithm, a location for the allocated dot pattern being selected by at least one random number generator, whereby at least one unique electronic footprint is created in a specified location that is recorded in the master file.

4. The encoding system of claim 1, wherein the master file is coded to recognize and selectively manifest one of a plurality of characters from the data set according to a visual coded pattern contained within the overlay file.

5. The encoding system of claim 4, wherein the master file when appropriately aligned in combination with the overlay file displays at least one unique character.

6. The encoding system of claim 1, wherein the data field comprises quadrants allowing provide a plurality of configurations of the data field.

7. The encoding system of claim 6, wherein each quadrant of the data field comprises a the unique coding pattern of each quadrant having has at least ten levels of coding.

8. The encoding system of claim 7, wherein the at least ten levels of coding comprises one of a set of integers between zero and nine, a set of alpha characters from A to Z and combinations thereof.

9. The encoding system of claim 8, wherein one of the at least ten levels of coding within one quadrant comprises a character with at least one graphic image.

10. The encoding system of claim 9, wherein the at least one character with at least one graphic image is assigned for use only to law enforcement wherein reserved priority access to law enforcement is granted to substantially all records.

11. The encoding system of claim 1, wherein there is a plurality of data files linked to provide at least one coded combination.

12. The encoding system of claim 1 wherein the code matcher function analyzes incoming data in the overlay file and master file to what is recorded in a master file to verify at least one code match.

13. A multi-level data encoding system operable on a computer, the encoding system comprising: an encoder adapted to encode a data set and separate the encoded data set into two files; a data field adapted to organize the encoded data set for proper decoding, wherein the data field comprises quadrants, each quadrant having a unique coding pattern; a master file comprising one of the files of the encoded data set; an overlay file comprising the other file of the encoded data set, the overlay file adapted to display at least one unique character when appropriately aligned in combination with the master file, wherein the master file is encoded to manifest and recognize a plurality of characters the data set contained within an overlay file, the master file comprising a visual coded pattern having a random number allocated dot pattern controlled by at least one algorithm selected by at least one random number generator, creating a unique electronic footprint; and a code matcher function adapted to compare the incoming data set on the overlay file and the master file with a master file stored in a database on a readable memory of a computer to verify at least one code match.

14. The encoding system of claim 13, further comprising a data field adapted to organize the encoded data set for proper decoding.

15. The encoding system of claim 14, the data field comprises quadrants allowing a plurality of configurations of the data field, wherein each quadrant of the data field comprises a unique coding pattern having at least ten levels of coding.

16. The encoding system of claim 15, wherein the at least ten levels of coding comprises one of a set of integers between zero and nine, a set of alpha characters from A to Z and combinations thereof.

17. A computer-implemented coding method using a multi-level data encoding system comprising: a computer configured to input at least one data set into at least one data set file; a computer configured to apply at least one coding algorithm to the at least one data set; encoding the at least one data set; a computer configured to organize the at least one encoded data set for proper decoding by use of a data field, wherein the data field comprises quadrants, each quadrant having a unique coding pattern; a computer configured to separate the at least one data set into at least two files, wherein the at least two files comprise at least one master file and at least one overlay file; a computer configured to use the at least one master file and the at least one overlay file to decode the encoded data set; and a computer configured to test the overlay file when received with information contained in the master file to verify at least one code match.

18. The computer-implemented coding method of claim 17, wherein the at least one master file comprises no more than fifty percent of the encoded data set.

19. The computer-implemented coding method of claim 18, wherein the at least one overlay file comprises no more than fifty percent of the data set.

* * * * *